(12) United States Patent
Bergqvist et al.

(10) Patent No.: US 10,720,034 B2
(45) Date of Patent: Jul. 21, 2020

(54) ANTI-THEFT SOLUTION FOR A BATTERY SYSTEM

(71) Applicant: INCELL INTERNATIONAL AB, Kista (SE)

(72) Inventors: Sven Bergqvist, Kista (SE); Andreas Dunge, Kista (SE)

(73) Assignee: INCELL INTERNATIONAL AB, Kista (SE)

( * ) Notice: Subject to any disclaimer, the term of this patent is extended or adjusted under 35 U.S.C. 154(b) by 0 days.

(21) Appl. No.: 16/483,267

(22) PCT Filed: Feb. 2, 2017

(86) PCT No.: PCT/EP2017/052264
§ 371 (c)(1),
(2) Date: Aug. 2, 2019

(87) PCT Pub. No.: WO2018/141390
PCT Pub. Date: Aug. 9, 2018

(65) Prior Publication Data
US 2019/0378390 A1 Dec. 12, 2019

(51) Int. Cl.
*G08B 13/24* (2006.01)
*H01M 10/42* (2006.01)
*G08B 21/02* (2006.01)

(52) U.S. Cl.
CPC ..... *G08B 13/2417* (2013.01); *G08B 21/0213* (2013.01); *H01M 10/4257* (2013.01)

(58) Field of Classification Search
CPC ............ G08B 13/2417; G08B 21/0213; G08B 13/1418; H01M 10/4257
(Continued)

(56) References Cited

U.S. PATENT DOCUMENTS 8,121,615 B2 * 2/2012 Carpio ................. G01S 5/0027
  455/456.1
9,496,720 B2 * 11/2016 McShane ............ H01M 10/488
(Continued)

FOREIGN PATENT DOCUMENTS

CN    201226551 Y    4/2009
CN    201294027 Y    8/2009
(Continued)

OTHER PUBLICATIONS

International Search Report for patent application No. PCT/EP2017/052264, dated Oct. 13, 2017.
(Continued)

*Primary Examiner* — John A Tweel, Jr.
(74) *Attorney, Agent, or Firm* — Moser Taboada

(57) ABSTRACT

A battery arrangement (100) and a method for operating a battery arrangement are provided. The battery arrangement comprises an identity reader (115) and a battery system (120). The identity reader is configured to obtain an identity from an identifier (110) fastened to an immobile object (150). The battery system is distinct from the immobile object. The battery arrangement is configured to disable at least part of the battery system in response to the identity reader being unable to obtain the identity. The method comprises monitoring a sensor for obtaining an identity from an identifier fastened to an immobile object and disabling at least part of the battery system in response to failure to obtain the identity. Accordingly, an anti-theft solution for a battery arrangement is provided.

20 Claims, 2 Drawing Sheets

(58) Field of Classification Search
USPC .................................................. 340/572.1
See application file for complete search history.

(56) References Cited

U.S. PATENT DOCUMENTS

| | | | | |
|---|---|---|---|---|
| 2003/0090239 | A1* | 5/2003 | Sakakibara | H02J 7/0071 |
| | | | | 320/166 |
| 2005/0110639 | A1 | 5/2005 | Puzio et al. | |
| 2008/0238609 | A1* | 10/2008 | Wiesner | G08B 13/1409 |
| | | | | 340/5.2 |
| 2010/0007506 | A1* | 1/2010 | Fischer | H02J 7/0047 |
| | | | | 340/636.1 |
| 2012/0013201 | A1 | 1/2012 | Pariseau et al. | |
| 2013/0141217 | A1* | 6/2013 | Goren | G08B 13/1418 |
| | | | | 340/10.1 |
| 2014/0320143 | A1 | 10/2014 | Butzmann et al. | |
| 2016/0316430 | A1* | 10/2016 | Fischer | H02J 9/061 |
| 2019/0033377 | A1* | 1/2019 | Karner | G01R 31/382 |

FOREIGN PATENT DOCUMENTS

| | | |
|---|---|---|
| CN | 201435442 Y | 3/2010 |
| CN | 202143212 U | 2/2012 |
| CN | 104244628 A | 12/2014 |
| CN | 205211879 U | 5/2016 |
| DE | 10104830 A1 | 10/2001 |
| EP | 2600325 A1 | 6/2013 |
| JP | 2012134796 A | 7/2012 |
| WO | WO-2007/057037 A1 | 5/2007 |

OTHER PUBLICATIONS

Written Opinion for application No. PCT/EP2017/052264, dated Jan. 18, 2019.
The International Preliminary Report on Patentability for application No. PCT/EP20171052264 dated Apr. 30, 2019.

* cited by examiner

ANTI-THEFT SOLUTION FOR A BATTERY SYSTEM

TECHNICAL FIELD

The present invention generally relates to the field of anti-theft protection for battery systems. Specifically, the battery system may for example be arranged as a backup power source in a base station of a mobile communication system.

BACKGROUND

To meet the availability demands for base stations in mobile communication systems, even in case of power outage, a backup power source, for example a battery system, is needed. However, due to base stations sometimes being located remotely and not always being staffed, it is difficult to prevent battery theft. Theft may prove costly and affect the availability of the site using the batteries.

Previously known anti-theft systems for batteries include GPS-based systems for batteries in base stations. In those anti-theft systems, a GPS-tracker is employed to track stolen batteries and to trigger an alarm in case a battery is outside of a specific area.

One specific problem with this type of system is that the GPS might be non-functional or jammed in some way, and then an alarm will not be triggered. The GPS also requires an unimpeded channel for the satellites to work. Further, GPS might not work inside a building.

Another problem with alarms is that they do not prevent theft as such. Instead, they only make the risk of discovery larger for a thief. If the thief would get past the alarm system, the batteries are still attractive to steal.

The above mentioned problems lead to drawbacks such as existing anti-theft systems not being as reliable and not as fault tolerant as desired. They may also not prevent theft to the extent desired.

SUMMARY

It is an object of the present disclosure to mitigate at least some of the above problems of the prior art, and to provide a battery arrangement and a method resulting in an improved anti-theft protection that deters from stealing batteries of the battery arrangement.

Hence, according to one aspect, a battery arrangement is provided. The battery arrangement comprises an identity reader and a battery system. The identity reader is configured to obtain an identity from an identifier fastened to an immobile object. The battery system may be arranged to be distinct from the immobile object, and the battery arrangement is configured to disable at least part of the battery system in response to the identity reader being unable to obtain the identity.

With this arrangement the identity reader is enabled to act on action resulting in the identity not being readable, for example due to that the identity or identity reader have been tampered with, or that the battery arrangement has been removed from its intended place. As a response to that, at least part of the battery system is disabled. This lowers the value of removal and attempted reuse of the batteries, and therefore may reduce the risk for theft.

It will be appreciated that the term "immobile object" herein may refer to an object fastened or arranged in such a way that it is practically very hard to dislocate it. The immobile object may for example be a wall or part of a building.

By "identifier" it is meant a device capable of storing, or being associated with, an identity. That may, for example, be a RFID tag with an associated identity, or a barcode where the code itself may be the identity. The identity reader may read the identifier to obtain the associated identity.

With the term "distinct" it is meant that the battery system is separate from the immobile object. The battery system may, as such, be physically deplacable/remobable from its location. The present disclosure however provides anti-theft protection to reduce such an action when performed by thieves.

The identity reader may also be referred to as a receiver adapted to receive an identity from an identifier.

In one embodiment, the identity reader may have a wired connection to the battery system for signaling to the battery system whether the identity has been obtained by the identity reader. Having a wired connection to the battery system allows for a safer and more reliable channel of communication.

In another embodiment, the identity reader may be arranged within transmission range of the battery system for wirelessly signaling to the battery system whether the identity has been obtained by the identity reader or not. This alternative provides a more flexible arrangement with the reader not having to be wired to the battery system. For example, the reader may be arranged at a distance from the battery system. Multiple battery systems may listen to the same signaling from the identity reader. Radio signals may be used.

In one embodiment, the battery system may be configured to disable at least part of itself in response to signaling from the identity reader indicating that the identity reader is unable to obtain the identity. With the identity reader the battery system is informed that the identity is missing or unreadable, and the battery system can then be, at least partly, disabled.

In another embodiment the battery system may be configured to disable at least part of itself in response to an absence of signaling from the identity reader indicating that the identity reader is able to obtain the identity.

This is based on the realization that the absence of a signal, rather than an active signal, may render the battery system disabled. This provides for a safer anti-theft solution since tampering with the battery system's connection to other systems, or if the identification would in any other way fail, may disable at least part of the battery system. The battery system could be configured to only be fully enabled when there is a positive identification. In previous anti-theft systems there has been a need for a central controller, whereas in the present embodiments the anti-theft solution may be self-contained. Anti-theft protection is obtained without any outside information besides the identity of the identifier fastened to the immobile object. The battery arrangement can by itself determine to be in an enabled or disabled state based on the identity readings.

The battery system may comprise one or more battery modules including one or more battery cells and a controller arranged to monitor the one or more battery cells.

The battery system may in some embodiments be configured to prevent, or to cause the controller to prevent, in response to signaling from the identity reader indicating that the identity reader is unable to obtain the identity, charging and/or discharging of the one or more battery cells.

In one embodiment, the battery system may be configured prevent, in response to an absence of signaling from the identity reader indicating that the identity reader has obtained the identity, charging and/or discharging of the battery cell.

In those embodiments, the battery system can disable itself on a signal, or an absence of a signal, from the identity reader by deactivating a central function of the battery system, that is to charge and/or discharge the one or more battery cells.

Accordingly, there is no need for an external controller, or any associated connection, adapted to control the battery system's state to enable or to disable charging and/or discharging. In this embodiment, the dependence on outside communication that can be blocked or tampered with to keep the controller from disabling the battery system are reduced or even possibly eliminated, thereby increasing the security of the anti-theft protection implemented in the battery arrangement.

In one embodiment, the battery system may further comprise a monitoring unit configured to receive signaling from the identity reader and to control the disabling of the battery system.

The monitoring unit may also be referred to as a monitoring section or a monitor of the battery arrangement.

In some embodiments, the monitoring unit may be configured to transmit a control signal to the controller in response to signaling from the identity reader indicating that the identity has been obtained at the identity reader, and the controller could be configured to prevent charging and/or discharging of the battery cell in absence of the control signal.

The monitoring unit may be configured to transmit a control signal to the battery module in response to signaling from the identity reader indicating that the identity reader was unable to obtain the identity. The battery module may be configured to prevent charging and/or discharging of the battery cell in response to the control signal.

This is based on the realization that the absence of a signal, rather than an active signal, may render the battery disabled. The use of signals as described above may deter from not only removing the battery system from the correct place, but also removing and reusing the battery modules from the battery system since they may be disabled.

The controller may prevent charging and/or discharging when a control signal is absent. The control signal may originate from the monitoring unit. This reduces and even possibly eliminates the need for active signaling from the monitoring unit to disable the battery modules. Tampering with the battery module's connection to the controller, or if the identification or communication with the controller would in any way fail, may at least partly disable the battery modules. The battery modules could be configured to only be fully enabled when there is a positive identification signaled.

It will be appreciated that in the above embodiments the anti-theft protection may be divided between two effectively independent circuits, the monitoring unit being responsible for detecting errors in the identity readings, and the controller being responsible for sensing if the monitoring unit is removed. In other words, the anti-theft protection may be realized based on the identity reader being unable to obtain the identity and/or an absence of signaling from the identity reader.

In one embodiment, the monitoring unit may be configured to monitor a battery module via the controller and to provide information about a state of the battery module to a network. The network could, for example, be the Internet, a local area network, or some other type of communication network.

In an embodiment, the battery module may be arranged to power the monitoring unit. This may be done via wire, but also other ways of powering the monitoring unit might be possible. This reduces and even possibly eliminates the need for an external power source for the monitoring unit and the need for protection of it. If an external power source is powering the monitoring unit, a potential thief may try to tamper with it in order to steal the battery modules.

It may be preferable to use one monitoring unit, and one identity reader, for multiple battery modules, for example when the batteries are placed in a battery rack. The battery modules may then be interchanged without having to update the identity. The identity reader may simply signal that the correct identity has been read or received. The battery system may therefore comprise multiple battery modules. The monitoring unit may be configured to transmit control signals to the battery modules in response to signaling from the identity reader indicating that the identity has been obtained at the identity reader. The battery modules may be configured to prevent charging and/or discharging of the respective battery cells in absence of the control signal.

In some embodiments, the monitoring unit may be configured to transmit control signals to the one or more battery modules in response to an absence of signaling from the identity reader indicating that the identity reader is able to obtain the identity. Alternatively, and/or in addition, the monitoring unit may be configured to transmit control signals to the battery modules in response to signaling from the identity reader indicating that the identity reader is unable to obtain the identity. The battery modules may be configured to prevent charging and/or discharging of the battery cells in response to the control signal.

The monitoring unit may be configured to monitor the battery modules via the controllers and to provide information about states of the battery modules to the network.

In an embodiment, the battery module may be arranged to power the identity reader. This could be done via wire, but also other ways of powering the identity reader might be possible. This arrangement may increase the reliability of the system since it is self-powered. The use of an external power system for the identity reader may be envisaged but this increases the risk for not obtaining the expected power therefrom and/or rendering the batteries prevented from charging and/or discharging since there is no identity reading. In this embodiment, the identity reader is powered by the battery module(s) as long as there is a correct identity reading.

The identity reader may be configured to obtain the identity from the identifier via wireless signals. The wireless signals could, for example, be radio frequency signals, or other types of wireless signals.

In another embodiment, the identity reader may be configured to obtain the identity via signaling from the identifier. The identity reader may further comprise a transmitter configured to trigger the identifier to signal the identity. This further increases the security since an active identifier can be arranged so that it is difficult to copy.

According to some embodiments, the battery arrangement may be configured to check whether an identity obtained by the identity reader matches a stored identity, and to disable at least part of the battery system in case an identity matching the stored identity has not been obtained by the identity reader. By "check" if an identity matches a stored identity it is meant to, for example, compare the received identity with one stored in the battery system, for example at the identity reader or at the monitoring unit. The received identity could be encrypted for increased security, and/or the communications channel could be encrypted.

Using encryption increases the security of the anti-theft function of the battery arrangement since the identity cannot be altered, and a potential thief cannot change the expected identity for the reader to obtain from the identifier. The expected identity may be stored at the identity reader and/or the monitoring unit. In order to successfully steal the batteries a thief will then also have to steal the identity. However, the identifier associated with the identity is fastened to the immobile object.

In one embodiment, the battery arrangement may be configured to disable at least part of the battery system in case an identity has not been obtained during a certain time interval. This could be beneficial in case there is a temporary malfunction in the identity reader.

As an illustrative example, the monitoring unit may attempt to read or obtain the identity at 5 minute intervals. Once deemed to be unobtainable the reader may perform additional attempts for a further 30 minutes before signaling that it is unable to obtain the identity or ceasing to send signals that the identity was obtained, or other types of signaling. Also other time periods may be used.

It will be appreciated that the battery system may be arranged as a backup power source to a system having a main power source distinct from the battery system. The system could, for example, be a mobile communication base station, a solar powered site during nighttime, or other systems that would benefit from having a battery arrangement as defined in any of the preceding embodiments.

According to another aspect of the invention, a battery installation is provided. The battery installation comprises a battery arrangement as described in any of the embodiments above and an identifier fastened to an immobile object.

In the battery installation the identifier may, for example, comprise a passive transmitter configured to signal an identity using energy from a received signal.

In an embodiment of this installation, the identifier may be a radio frequency identification, RFID, tag. The RFID tag may be in the form of a sticker that could be a break-on-removal sticker. The RFID tag may be replaced by other types of identifiers to detect that the battery module is moved from its intended location. Advantages of using RFID are that the unique RFID is difficult for a thief to replicate, and that passive RFID tags do not need any separate power source.

According to an aspect, a base station for a mobile communications network or telecommunications system comprising a battery arrangement, according to any of the embodiments described above, is provided.

According to another aspect, a method of operating a battery system is provided. The method comprises the steps of monitoring a sensor for obtaining an identity from an identifier fastened to an immobile object and the step of disabling at least part of the battery system in response to failure to obtain the identity.

In one embodiment of the method, the method may further comprise signaling an identity from an identifier fastened to an immobile object.

In one embodiment the battery arrangement may comprise lithium batteries.

It is noted that embodiments of the present disclosure relate to all possible combinations of features recited in the claims. Further, it will be appreciated that the various embodiments described for the battery arrangement, according to the first aspect, are all combinable with embodiments of the battery installation, base station and method, according to the other aspects, and vice versa.

BRIEF DESCRIPTION OF THE DRAWINGS

This and other aspects will now be described in more detail in the following illustrative and non-limiting detailed description of embodiments, with reference to the appended drawings. In what follows, example embodiments will be described in greater detail and with reference to the accompanying drawings, on which.

All the figures are schematic and generally only show parts which are necessary in order to elucidate the respective embodiments, whereas other parts may be omitted or merely suggested.

DETAILED DESCRIPTION OF EMBODIMENTS

Figure 1:
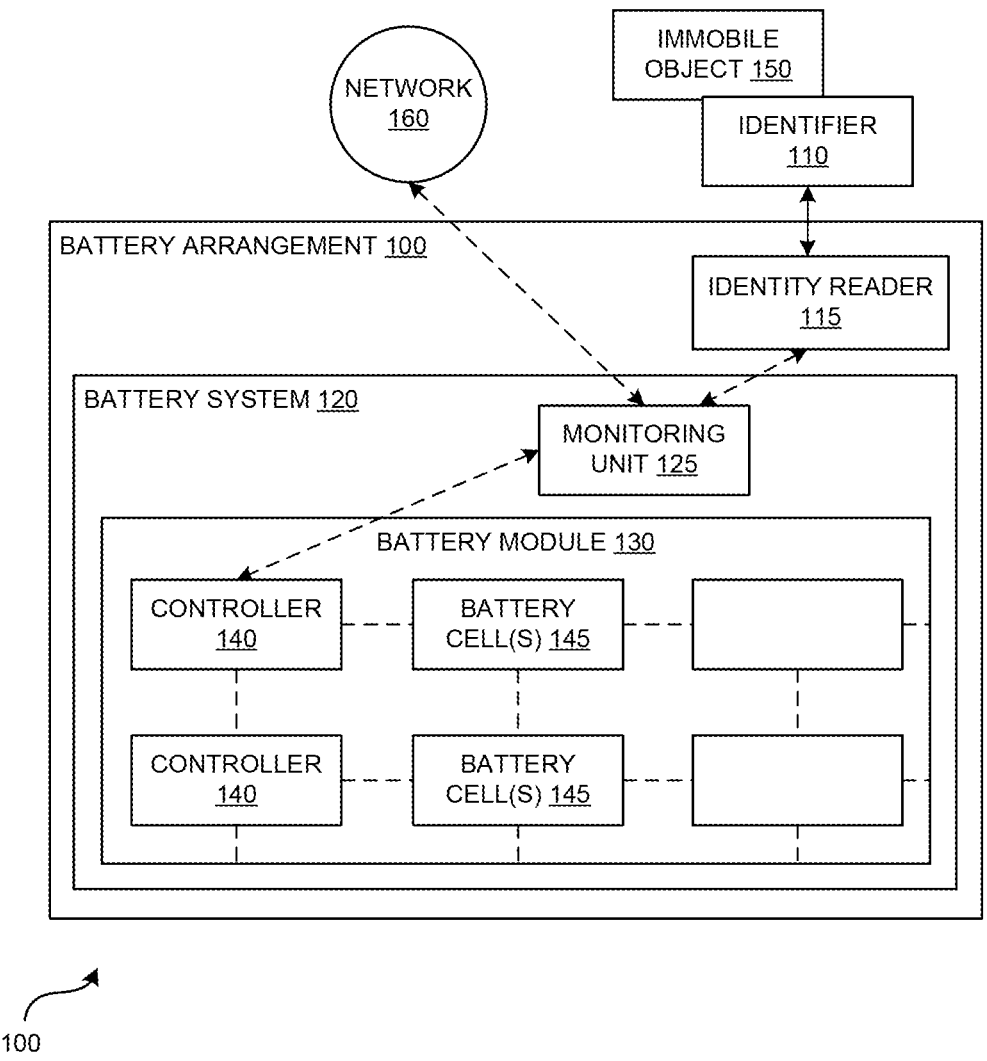
FIG. 1 is a block diagram of a battery arrangement, according to an embodiment.

FIG. 1 is a block diagram of a battery arrangement 100 according to one embodiment. The battery arrangement 100 comprises an identity reader 115 and a battery system 120.

The identity reader 115 may be configured to obtain an identity from an identifier 110. The identifier 110 may be fastened to an immobile object 150, such as a wall, for example.

The battery system 120 may be arranged to be distinct from the immobile object 150, and the battery arrangement 100 may be configured to disable at least part of the battery system 120 in response to the identity reader being unable to obtain the identity.

The identity reader 115 may be adapted to read an identity from the identifier 110. The identity reader 115 may be connected to the battery system 120, for example, by a wired connection or by a wireless connection.

The battery system 120 may comprise a monitoring unit 125 and one or more battery modules 130. The battery modules 130 may comprise a controller 140 and one or more battery cells 145.

The immobile object 150 could be an object that is fastened or arranged in such a way that it is practically very hard to dislocate it.

To further impede the possibilities of dislocating and reusing the battery system 120, the identifier 110 fastened to the immobile object 150 may be arranged in such a way that it is virtually impossible to remove it without destroying or damaging it. The battery arrangement 100 may be arranged so that the identity reader 115 can obtain the identity of the identifier 110 fastened to the immobile object 150. In other words, the battery arrangement is arranged at a suitable distance from the immobile object 150 for reading the identifier. In case the battery arrangement 100 would be arranged so that the identity reader 115 cannot obtain the identity from the identifier, the battery system 120 will be disabled. This could, for example, be caused by tampering with the identifier 110, the identity reader 115, or moving the battery arrangement 100.

As mentioned above, the identity reader 115 may be adapted to read the identifier 110. The identity reader 115 may be arranged in relation to the identifier 110 so that it can obtain the identity from the identifier 110 when it is in its intended location. However, when not in its intended location in relation to the identifier, for example in case of theft, the identity reader 115 may not be able to read the identifier 110. The identity reader 115 may be arranged in relation to the identifier 110 so that it is not able to read the identifier 110 when not in its proper location in relation to the identifier 110.

The identity reader 115 may, for example, be an RFID reader and the identifier 110 may be a break-on-removal RFID tag, but also other types of identity reader 115 and identifier 110 are possible. Other combinations of identity reader 115 and identifier 110 could be a barcode scanner and a barcode, or an identity communicated over radio frequency signals. In these combinations, the communication between the identity reader and the identifier may be wired or wireless.

The identifier 110 may be active in signaling the identity, such as being a transmitter, or it can be passive as in the examples above.

In some embodiments, the identity reader 115 may continuously scan the identifier 110, and in case the identifier 110 is unreadable the identity reader 115 may signal such information to the battery system 120 through the connection to the battery system. The battery system 120 can then, at least partly, disable charging and/or discharging of the battery modules 130.

The identity reader 115 may have a wired connection to the battery system 120 for signaling to, or communicating with, the battery system 120 whether the identity 110 has been obtained at the identity reader 115.

Alternatively, the identity reader 115 may be arranged within transmission range of the battery system 120 for wirelessly signaling to the battery system 120 whether the identity has been obtained at the identity reader 110.

The identity reader 115 may be configured to obtain the identity from the identifier 110 via wireless signals. One example of such signals may be radio frequency signals.

Further, the identity reader 115 may be configured to obtain the identity via signaling from the identifier 110. The identifier 110 can then signal the identity, rather than just being a passive transmitter.

In case the identifier 110 is arranged so it can actively signal the identity, the identity reader 115 may trigger it to signal the identity.

The battery arrangement 100 may be configured to check whether an identity obtained by the identity reader 115 matches a stored identity, and to disable at least part of the battery system 120 in case an identity matching the stored identity has not been obtained by the identity reader 110. The identity may be stored by the identity reader 110, by the monitoring unit 125 or by the one or more controllers 145. The comparison may be performed by the identity reader 110, the monitoring unit 125 or by the one or more controllers 140.

In one embodiment, the battery arrangement may disable at least part of the battery system 120 in case an identity matching the stored identity has not been obtained by the identity reader 110 during a certain time interval.

The signaling between the identity reader 115 and the battery system 120 may be configured so that it is difficult to replicate, for example through communication via encrypted communication channels or via encrypted messages.

In one embodiment, the battery module 130 may be arranged to power the identity reader 115. This is may be done by a wire, but also wireless methods of powering the identity reader 115 may be suitable.

The battery system 120 may be configured to disable at least part of itself in response to signaling from the identity reader 115 indicating that the identity reader 115 is unable to obtain the identity. It will be appreciated that the charging/discharging function of the battery system may for example be disabled.

The battery system 120 may be configured to disable at least part of itself in response to an absence of signaling from the identity reader 115 indicating that the identity reader 115 is able to obtain the identity 110.

In this way, the battery system 120 will be, at least partly, disabled if it does not receive a signal that the identity has been correctly read or received. The battery system 120 may also be configured to disable itself if it receives a signal that the identity cannot be read or received.

The monitoring unit 125 may be a power backup manager (PBM) or a site controller. The monitoring unit 125 can communicate with the identity reader 115 and receive signals about the state of the identity readings. The monitoring unit 125 may raise an alarm and/or signal to the battery modules 130 if the identity reading was unsuccessful or if there is a lack of signaling indicating that the identity was successfully obtained.

The battery system 120 may comprise multiple battery modules 130 including respective battery cells 145 and controllers 140.

The monitoring unit 125 may be configured to transmit control signals to the controllers 140 in response to signaling from the identity reader 115 indicating that the identity has been obtained at the identity reader 115, and the controllers 140 may be configured to prevent charging and/or discharging of the respective battery cells 145 in absence of the control signal at the respective controllers 140.

The monitoring unit 125 may be adapted to wirelessly or by wire communicate with the network 160 to send signals about the state of the battery module 130, the identity readings and raised alarms.

The monitoring unit 125 may also provide a bypass option for disabled battery modules 130 through the network communication to bypass a disabling of the battery system 120. This could be beneficial in case of a broken identity reader 115 or identifier 110, or otherwise malfunctioning of the signaling. It could also be beneficial to reuse batteries that have been disabled.

The battery module 130 may be arranged to power the monitoring unit 125. For example, the monitoring unit 125 may be wired to the battery modules 130 for power. There may also be suitable wireless methods for powering the monitoring unit 125.

The controller 140 can, for example, be a battery management system (BMS). The controller 140 may be arranged to monitor and/or control the battery cell 145. The controller 140 may prevent charging and/or discharging of the battery cell 140, for example in response to signaling from, or an absence of signaling from, the monitoring unit 125. The monitoring unit 125 is configured to transmit control signals to the controller(s) 140 in response to signaling from the identity reader 115 indicating that the identity has been obtained at the identity reader 115. The controller(s) 140 are configured to prevent charging and/or discharging of the respective battery cells 145 in absence of the control signal from the respective controller(s) 140.

The controller 140 may further signal the status of the battery module 130 to the monitoring unit 125. These signals could be indicating that the battery module 130 is well or an error message indicating that the battery module 130 is not functioning as expected.

The monitoring unit 125 may send control signals to the controller(s) 140. The signals may be keep-alive signals. A keep-alive signal is an indication that the controller 140 may not disable the charging and/or discharging of the battery modules 130. The keep alive signal may be absent for a number of reasons, for example, it could indicate that the monitoring unit 125 has been tampered with, that the identity reader 115 has been tampered with, that the identity reader 115 was unable to obtain the identity from the identifier 110, among others. These, and other reasons may be indications of attempted theft, and therefore the battery system 120 may be at least partly disabled. An absence of a keep-alive signal indicates that the controller 140 may disable the battery modules 130.

The communication between the monitoring unit 125 and the controller 140 may be established such that it is hard to replicate or intercept. The signals may be authorized through a challenge-response scheme. If the keep-alive or control signals fail or indicate failure, the controller 140 may partly prevent charging and/or discharging of the battery cells 145.

Figure 4:
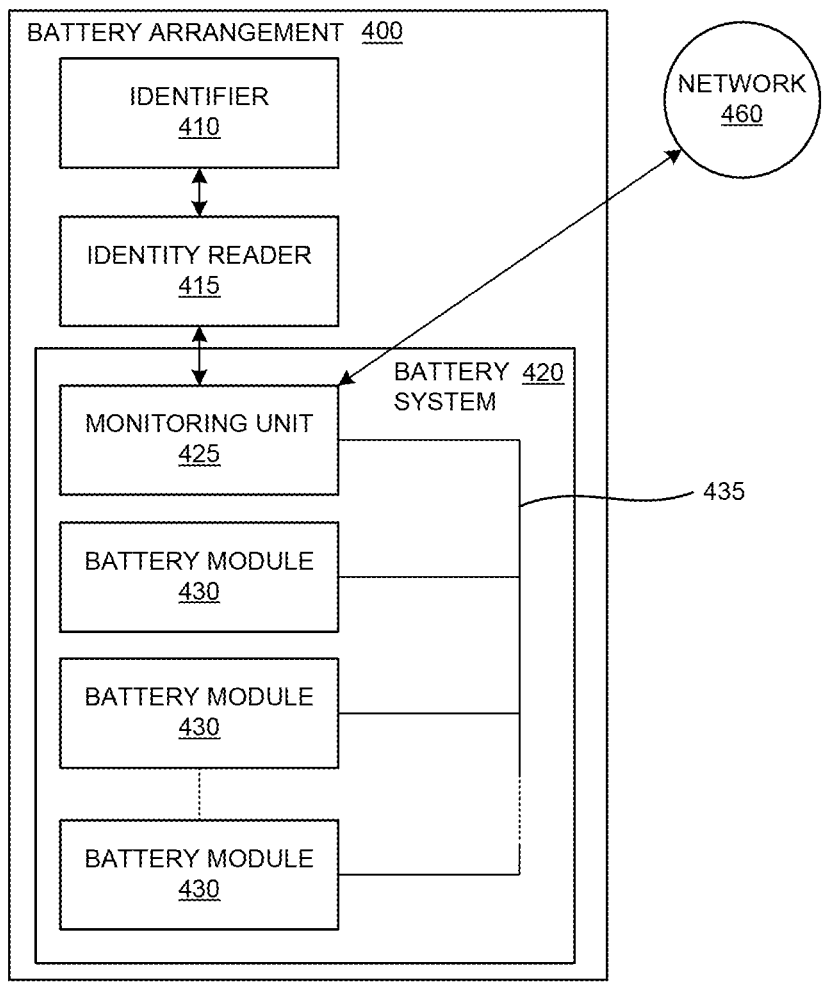
FIG. 4 is a block diagram of a battery arrangement in a battery cabinet, according to an embodiment.

In an embodiment, for example as shown in FIG. 4, the monitoring unit 425 may communicate with the one or more battery modules 430. In the present example, the monitoring unit and the one or more battery modules communicate through a CAN bus 435, but also other means of communication are possible. The communication between the monitoring unit 425 and the battery modules 430 to ensure that the correct identity has been obtained may be carried out through secure communication, for example by using encryption.

The battery modules may report status information or monitoring information via CAN.

As described above, in an embodiment the battery modules 130 may send monitoring information to the monitoring unit 125. The monitoring unit 125 may prevent the battery module 130 from charging and/or discharging via the controller 140 in response to error messages received from the battery modules 130.

The battery system 120 can also be configured so that the initial state of the arrangement is not set to a locked state. A battery system 120 that is not in a locked state can be used without the signaling from the identity reader 115 that an identity has been read.

Once an identity has been successfully read by the identity reader 115 the monitoring unit 125 may automatically enter a locked state and transmit a lock command to the battery modules 130. The identity obtained may be stored at the monitoring unit 125 or at the identity reader 115. The battery system 120 and the battery modules 130 are then in a locked state based on the obtained identity. The battery system 125 will at least party disable the charging and or discharging from the battery modules 130 unless the identity reader 115 has signaled that it has obtained the specific identity that the identity reader 115 or the monitoring unit 125 has stored.

The battery system 120 may for example be used as a backup power source to a system having a main power source distinct from the battery system 120. It may be used as a power backup source in a mobile communications base station, a solar powered site during nighttime, or any other system that would benefit from having a battery arrangement 100.

The controller 140 and the battery cells 145 may be arranged in a casing.

In some embodiments, the battery modules 140 may comprise lithium batteries.

It will be appreciated that there may be a discharge switch for the battery modules that can be turned on and off. There may be a grace period from when the discharge switch is turned on, during which the batteries are not fully prevented from discharging to allow for the system to recover in case of a false prevention of the discharging.

Figure 2:
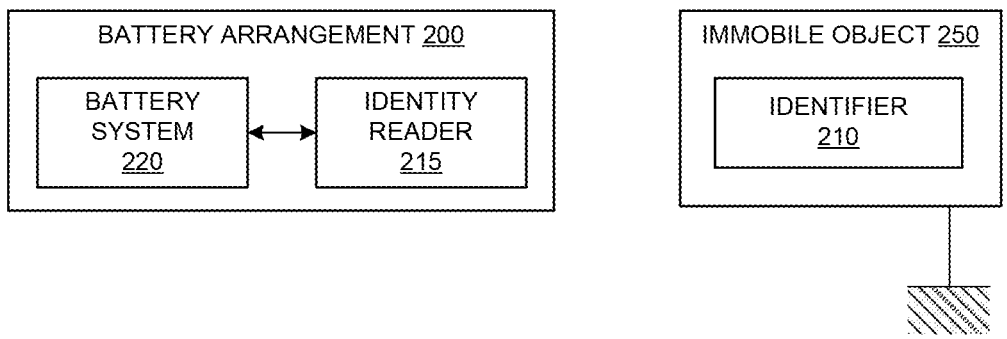
FIG. 2 is a block diagram of a battery installation, according to an embodiment.

FIG. 2 shows a block diagram of a battery installation 200, according to one embodiment. The battery installation comprises an identifier 210 and a battery arrangement 200. The identifier is fastened to an immobile object 250. The identifier 210 and the battery arrangement 200 may be any of the identifier and the battery arrangement 100, respectively, as described in the above embodiments.

The immobile object 250 may be a wall or similar in a mobile communication base station, or any other object that is practically impossible to move. The identifier may be permanently fastened to the immobile object, or be arranged so that it breaks on removal from the immobile object. The identifier may be arranged so that it is not movable, or at least very hard to move, at the same time as the battery arrangement.

The battery arrangement may be arranged so that it can read the identity of the identifier 210 wirelessly or by wire. However, if the battery arrangement is not in its intended place, the identifier may not be readable by the identity reader 215.

The identifier may comprise a passive transmitter configured to signal an identity using energy from a received signal. The identifier may, for example, be a radio frequency identification, RFID, tag. Further, the identifier may be a sticker or a break-on-removal sticker.

Figure 3:
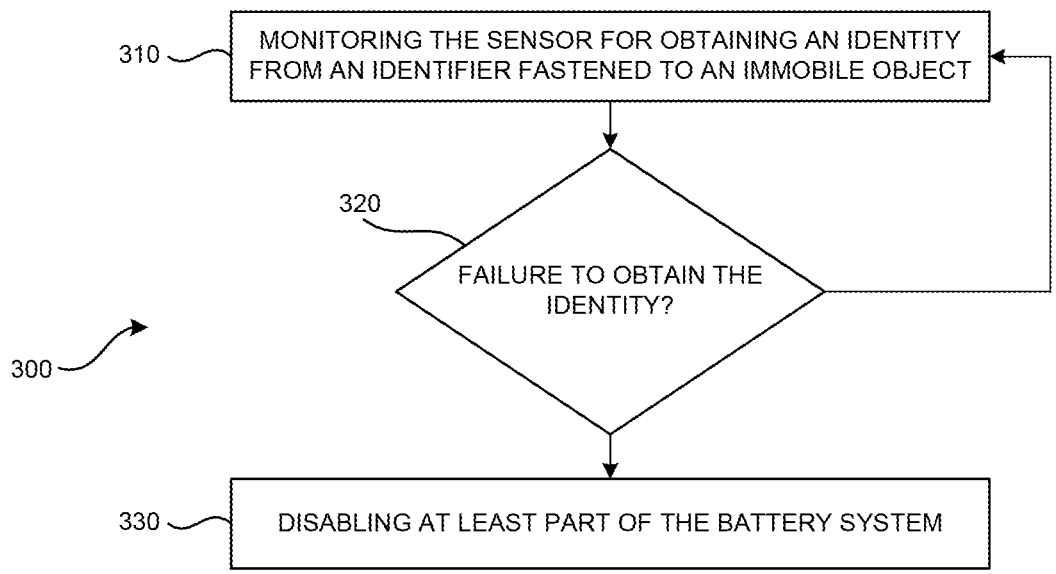
FIG. 3 is an overview of a method for operating a battery system, according to an embodiment.

FIG. 3 shows a method 300 for operating a battery system, according to an embodiment. The method comprises the steps of:

monitoring 310 the sensor for obtaining an identity from an identifier fastened to an immobile object, and disabling 330 at least part of the battery system in response to 320 failure to obtain the identity.

The method may further involve continuing to monitor 310 the sensor for obtaining an identity from an identifier after a failure to obtain the identity.

The person skilled in the art realizes that the present invention is by no means limited to the preferred embodiments described above. On the contrary, many modifications and variations are possible within the scope of the appended claims. For example, the identifier and identity reader can be implemented in different ways. Further, there are many ways of communicating between the identifier and the identity reader. In the same way, many different options for the communication channels between the identity reader, the monitoring unit(s), the controller(s) and the battery cell(s) are available.

Further, although in the above described embodiments the identity reader and the monitoring unit are arranged as two separate units or entities, in some other embodiments the identity reader and the monitoring unit may be integrated, i.e. arranged as one unit. More specifically, the identity reader may be arranged as a part of the monitoring unit.

Additionally, variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The division of tasks between functional units referred to in the present disclosure does not necessarily correspond to the division into physical units; to the contrary, one physical component may have multiple functionalities, and one task may be carried out in a distributed fashion, by several physical components in cooperation. The mere fact that certain measures are recited in mutually different dependent claims does not indicate that a combination of these measures cannot be used to advantage. Any reference signs in the claims should not be construed as limiting the scope.

The invention claimed is:

1. A battery installation comprising:
an identifier permanently fastened to an immobile object; and
a battery arrangement comprising:
an identity reader configured to obtain an identity from said identifier; and
a battery system distinct from the immobile object, wherein the battery arrangement is configured to disable at least part of the battery system in response to the identity reader being unable to obtain the identity and wherein the battery system is arranged as a backup power source to a system having a main power source distinct from the battery system.

2. The battery installation of claim 1, wherein the battery system is adapted to be used as a backup power source in a mobile communications base station.

3. The battery installation of claim 1, wherein the identity reader has a wired connection to the battery system for signaling to the battery system whether the identity has been obtained at the identity reader, or wherein the identity reader is arranged within transmission range of the battery system for wirelessly signaling to the battery system whether the identity has been obtained at the identity reader.

4. The battery installation of claim 1, wherein the battery system is configured to disable at least part of itself in response to signaling from the identity reader indicating that the identity reader is unable to obtain the identity or in response to an absence of signaling from the identity reader indicating that the identity reader is able to obtain the identity.

5. The battery installation of claim 1, wherein the battery system comprises:
a battery module including a battery cell and a controller arranged to monitor the battery cell.

6. The battery installation of claim 5, wherein the battery system is configured to prevent, in response to signaling from the identity reader indicating that the identity reader is unable to obtain the identity or in response to an absence of signaling from the identity reader indicating that the identity reader has obtained the identity, charging and/or discharging of the battery cell.

7. The battery installation of claim 1, wherein the battery system further comprises a monitoring unit configured to receive signaling from the identity reader and to control the disabling of the battery system.

8. The battery installation of claim 7, wherein the battery system comprises a battery module including a battery cell and a controller arranged to monitor the battery cell, wherein the monitoring unit is further configured to transmit a control signal to the battery module in response to signaling from the identity reader indicating that the identity has been obtained at the identity reader, and wherein the battery module is configured to prevent charging and/or discharging of the battery cell in absence of the control signal; and/or wherein the monitoring unit is further configured to transmit a control signal to the battery module in response to signaling from the identity reader indicating that the identity reader was unable to obtain the identity, and wherein the battery module is configured to prevent charging and/or discharging of the battery cell in response to the control signal.

9. The battery installation of claim 7, wherein the monitoring unit is further configured to monitor a battery module of the battery system and to provide information about a state of the battery module to a network.

10. The battery installation of claim 7, wherein a battery module of the battery system is arranged to power the monitoring unit.

11. The battery installation of claim 5, wherein the battery module is arranged to power the identity reader.

12. The battery installation of claim 1, wherein the identity reader is configured to obtain the identity from the identifier via wireless signals.

13. The battery installation of claim 1, wherein the identity reader is configured to obtain the identity via signaling from the identifier.

14. The battery installation of claim 10, wherein the identity reader comprises a transmitter configured to trigger the identifier to signal the identity.

15. The battery installation of claim 1, wherein the battery arrangement is configured to check whether an identity obtained by the identity reader matches a stored identity, and to disable at least part of the battery system in case an identity matching the stored identity has not been obtained by the identity reader.

16. The battery installation of claim 1, wherein the identifier comprises a passive transmitter configured to signal an identity using energy from a received signal.

17. The battery installation of claim 1, wherein the identifier is a radio frequency identification, RFID, tag.

18. A base station in a mobile communications system, said base station comprising a battery installation as defined in any one of the preceding claims.

19. A method of operating a battery system in a battery installation comprising an identifier permanently fastened to an immobile object and a battery arrangement comprising a sensor configured to obtain an identity from said identifier and a battery system distinct from the immobile object, wherein the battery system is arranged as a backup power source to a system having a main power source distinct from the battery system, the method comprising:
monitoring said sensor for obtaining the identity from the identifier permanently fastened to the immobile object; and
disabling at least part of the battery system in response to failure to obtain the identity.

20. The method of claim 19, further comprising:
receiving a signal indicating the identity of the identifier permanently fastened to the immobile object.

* * * * *